United States Patent [19]
Nollen

[11] 3,895,523
[45] July 22, 1975

[54] THERMOMETER

[75] Inventor: Bernard Nollen, Ahrensburg, Germany

[73] Assignee: Michael Obladen, Hamburg, Germany; a part interest

[22] Filed: Oct. 2, 1974

[21] Appl. No.: 511,290

[30] Foreign Application Priority Data
Oct. 8, 1973 Germany............................ 2350441

[52] U.S. Cl. .................. 73/356; 73/368.2; 73/371; 116/114.5
[51] Int. Cl.² ......................................... G01K 5/00
[58] Field of Search .......... 73/356, 358, 368.2, 371; 116/114 V, 114.5

[56] References Cited
UNITED STATES PATENTS
3,001,401  9/1961  Vernet et al........................... 73/358
3,430,491  3/1969  Gighilliat ............................. 73/356 X
3,631,721  1/1972  Nollen et al. ....................... 73/371 X
3,688,582  9/1972  Gradishar ............................. 73/371
3,774,450  11/1973  Godsey ................................ 73/358

Primary Examiner—Richard C. Queisser
Assistant Examiner—Frederick Shoon
Attorney, Agent, or Firm—H. Dale Palmatier; James R. Haller

[57] ABSTRACT

A thermometer comprising a cavity filled with an indicating agent and paraffinic hydrocarbons such as eicosane, heneicosane and docosane encapsulated within a multitude of very small capsules. The paraffinic hydrocarbons and the indicating medium may either form a mixture within the capsules or may be contained in two different groups of capsules, or the hydrocarbons may be contained within capsules which are in turn suspended in a liquid indicating medium. The indicating medium may be contained within destructible capsules to provide a thermometer for only a single indication of the attainment of a specified temperature, or form a vehicle for the expandable capsules to provide a normal reusable thermometer. The thermometer body is made of plastic and metallic sheet materials.

20 Claims, 9 Drawing Figures

PATENTED JUL 22 1975 3,895,523

SHEET 1

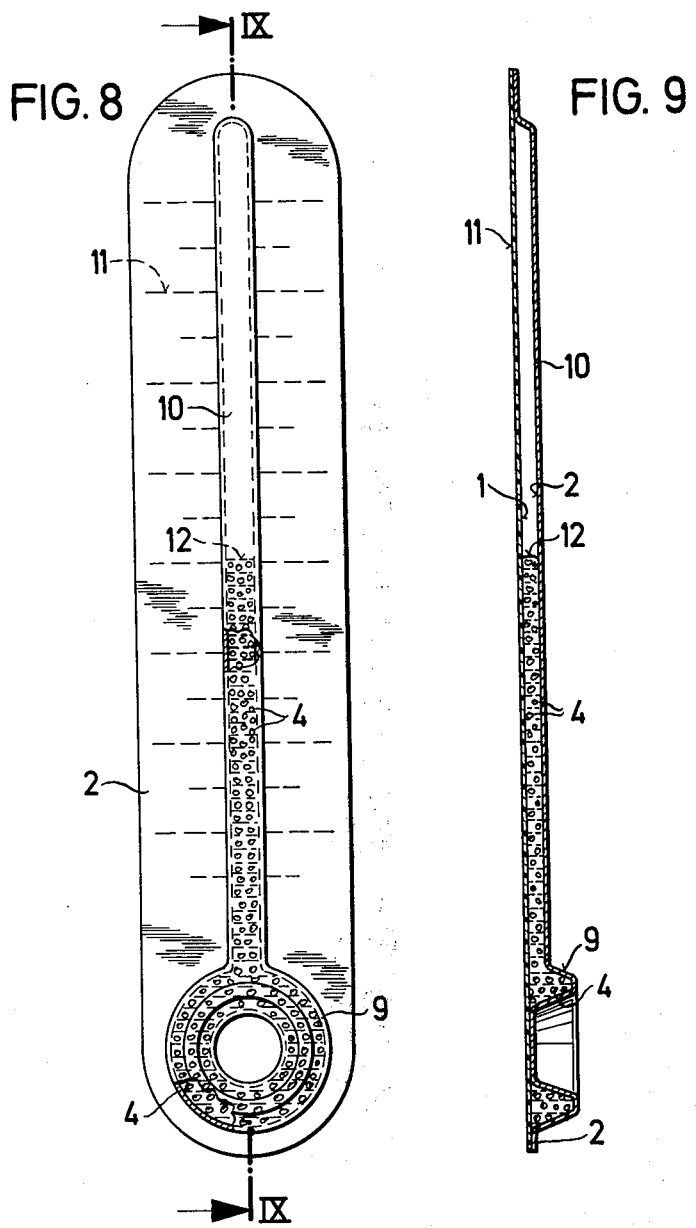

THERMOMETER

The present invention relates to a thermometer working on the basis of volume expansion of paraffinic hydrocarbons such as eicosane, heneicosane and docosane, and including an indicating agent disposed within an enclosed cavity.

In a conventional thermometer of the above type, the paraffinic hydrocarbons are separated from the indicating medium by a diaphragm. In this thermometer the paraffinic hydrocarbons are disposed within a lower portion of the thermometer, and on top of these paraffinic hydrocarbons and separated therefrom by a diaphragm is disposed a fluid indicating medium. An example of a thermometer of this type is shown in the German Pat. No. 1,698,085 of B. Nollen et al.

In practice it has been found that this conventional thermometer cannot be used for every type of application. This difficulty is especially encountered when desiring a very fast temperature indication in a low cost thermometer that may be used once only, i.e. as a disposable thermometer ("throw-away" thermometer).

It is now an object of the present invention to provide a novel and improved thermometer of the above type which thermometer is devoid of the above described drawbacks.

For basically achieving this object the paraffinic hydrocarbons are encapsulated within a multitude of relatively small capsules disposed within the indicating medium.

Since the paraffinic hydrocarbons are encapsulated within a multitude of relatively small capsules, a large surface is provided which results in a fast response to any temperature variation. No difficulties will be encountered with the encapsulating skin of the capsules since the capsules containing the paraffinic hydrocarbons are admixed in a suitable proportion with the indicating medium or even enclose this medium so that upon a volume expansion under the influence of heat the paraffinic hydrocarbons may act on the indicating medium. The encapsulating skin may optionally be made resilient.

The capsules for enclosing the paraffinic hydrocarbons may be manufactured in a manner known per se from e.g. commercial gelatine with or without the addition of a plastic material such as polyvinyl chloride, polytetrafluoroethylene or the like.

The indicating medium may consist of a liquid such as a mixture of water and a dye, as in the above described prior art thermometer. The indicating medium may also consist of a paste such as vaseline or glyzerine. The dye may consist of a natural or synthetic dyestuff such as aniline dyes, inks, etc.

The indicating medium may also be provided in the form of destructible capsules filled with a dyestuff or a pigment or any suitable substance adapted to change color upon destruction of the capsules by reaction with another substance that may be contained in for example paper. Destructible capsules of this type that are filled with a dyestuff are already conventional in another technical field of art, i.e. in the field of so-called "write-through"— or copying papers. When utilizing destructible dye-filled capsules of this type for manufacturing a thermometer in accordance with the present invention these capsules will be admixed in a suitable ratio with the capsules containing the paraffinic hydrocarbons. At a well defined predetermined temperature, i.e. for a certain volumetric expansion of the capsules containing the paraffinic hydrocarbons, the dye-containing capsules will be destroyed so that the dye is squeezed out of these capsules and produces a distinct indication. The temperature at which this destruction of capsules may occur can be predetermined exactly by suitable selection of the various materials.

The thermometer of the present invention may likewise be designed in a manner so that the indicating medium consists of a substance included in the paraffinic hydrocarbons-containing capsules and is adapted to change color upon destruction of the skin of the paraffinic hydrocarbons-containing capsules. This color change may be produced by a chemical reaction. In this embodiment the indicating medium is virtually included within the capsules. When the capsules are destroyed at a specified predetermined temperature the indicating medium substance will be squeezed out of the capsules in changing its color.

Additionally, a flow agent such as blotting paper material or talcum may be included within the capsules of the two types. This flow agent serves to adsorb the dye squeezed out of the destroyed capsules. The flow agent such as talcum fills the interstices between the capsules in thus reducing to a minimum the volume of any entrapped air.

A simple and economical method of manufacturing the thermometer of the present invention, particularly when the indicating medium is encapsulated or contained together with the paraffinic hydrocarbons within the paraffinic hydrocarbons-containing capsules consists in pressing so-called tablets or pellets in which the desired types of capsules are combined in a selected number and ratio. Such tablets or pellets may then be used for manufacturing thermometers of different configurations and for a multitude of different applications.

The thermometer filling and the configuration of the capsules receiving cavity may be selected such that upon reaching a predetermined temperature a color change will be initiated at a certain point and then the color change progresses with increasing temperature so that the temperature response may be directly observed.

When the indicating medium consists of destructible capsules filled with a dye then the thermometer may of course be employed only once as a lost or "throw-away" thermometer.

When using a liquid indicating medium such as in the above described conventional thermometers the thermometer may be used any number of times. In this case, the capsules containing the paraffinic hydrocarbons are contained in random orientation in the form of a suspension in an aqueous indicating fluid which likewise includes a dye.

Preferably, the thermometers are made from a metallic foil and suitably an aluminum foil in which have been stamped by deep-drawing one or several cavities for receiving the capsules and the indicating medium. A plastic sheet is then welded or bonded to this metallic foil. The plastic sheet is transparent at least in the regions in which the temperature reading will be taken.

Further advantages and additional characteristics of the thermometer in accordance with the present invention will be described in the following with reference to the various embodiments shown in the appended drawing wherein FIG. 1 is a top view of a first embodiment of the inventive thermometer in the form of a throw-away thermometer;

FIG. 8 is a top view of a further embodiment of a reuseable thermometer in accordance with the present invention; and FIG. 9 is a sectional view along the line IX—IX of FIG. 8.

Figure 1:
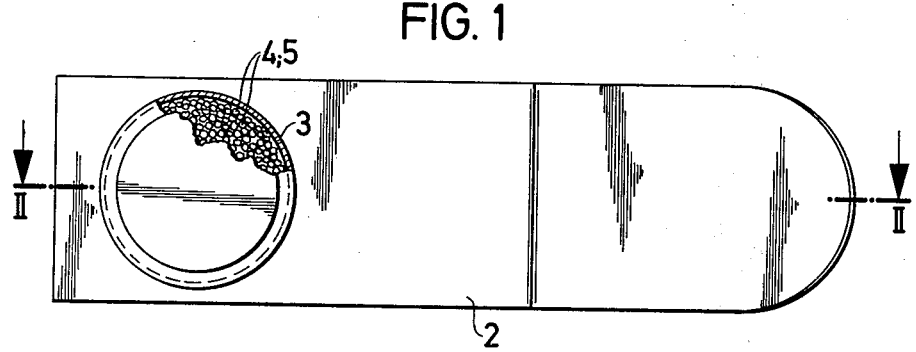
Figure 2:
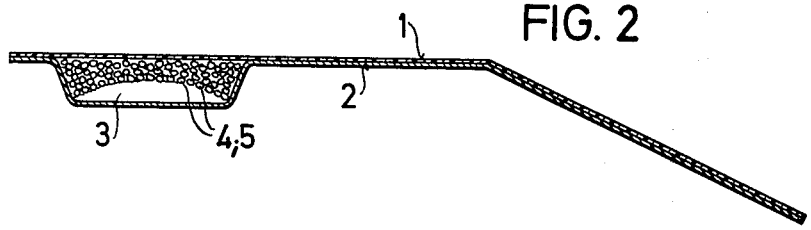
FIG. 2 is a sectional view along the line II—II of FIG. 1.

Referring first to FIGS. 1 and 2, the thermometer shown therein is a disposable thermometer for a single application. This thermometer may be employed for indicating the attainment or exceeding of a specific predetermined temperature such as 37° (98.6°F) for indicating increased temperatures of the human body for example. A metallic foil 2 includes a cavity 3 which is filled with paraffinic hydrocarbons-containing capsules 4 and with dye-containing destructible capsules 5. To the upper surface of the metallic foil 2 is welded a plastic sheet 1 that is transparent at least in the area of the cavity 3. When reaching a specified predetermined temperature such as 98.6 °F the capsules 4 will have expanded in volume to a threshold value at which the capsules 5 will be destroyed, i.e. "smashed." When the capsules 5 are destroyed, the dye is squeezed out of the capsules 5 and decolorates distinctly the contents of the cavity 3 in thus allowing to observe immediately at a glance that the specified temperature has been reached. In the case of a clinical thermometer, the indicating temperature may be selected to correspond substantially to a temperature of 98.6 °F. When an excess of the normal body temperature has been ascertained in this manner, then a more accurate measurement of the temperature may be made in order to find out the exact fever temperature.

The metallic foil 2 in which the cavity 3 is provided greatly facilitates the heat transfer from the measured body to the capsules 4 within the cavity 3.

The bottom wall of the cavity 3 may be curved concavely inwardly as may best be seen from FIG. 2. This concave curvature of the bottom wall of the cavity 3 assists in the destruction of the capsules 5 upon attaining the predetermined temperature.

One end portion of the thermometer may be bent as shown in defining a handle portion so that the thermometer may be readily inserted into the mouth of a patient and moreover cannot be swallowed up inadvertently by children.

Figure 3:
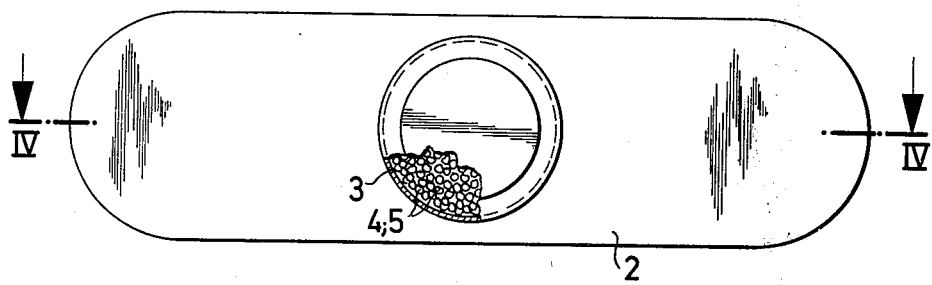
FIG. 3 is a top view of another embodiment of a throw-away thermometer in the form of an adhesive plaster.
Figure 4:
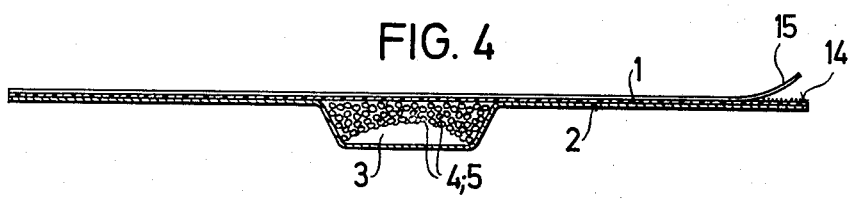
FIG. 4 is a sectional view along the line IV—IV of FIG. 3.

The embodiment of the thermometer of the present invention shown in FIGS. 3 and 4 is basically similar to the above described first embodiment but with the difference that the thermometer is an adhesive plaster clinical thermometer that may be attached adhesively to the skin of a patient by means of the metallic foil 2 having an adhesive coating (not shown) on its lower surface. The cavity 3 is in this case likewise formed within the metallic foil 2. The adhesive plaster thermometer may be carried by a patient at a protected spot over extended periods of time. Only when the temperature of the patient exceeds a predetermined specified temperature such as e.g. 98.6°F the above described decoloration effect will occur. When exceeding of the predetermined temperature is indicated a more accurate temperature measurement may be made. Here again the metallic foil 2 provides for a good heat transfer between the skin of the patient and the capsules 4. Also, in FIG. 4, it is depicted that the transparent plastic sheet 1 may have an adhesive film 14 applied to the upper surface thereof for attaching the thermometer to the skin of a person. A protective layer or lamina of plastic film or similar material 15 will initially cover the adhesive layer 14, but be removed to expose the adhesive for securing the thermometer to the skin of the person. The plastic sheet 1 will adequately transfer the body heat to the capsules 4 and 5, for the purposes described.

Figure 5:
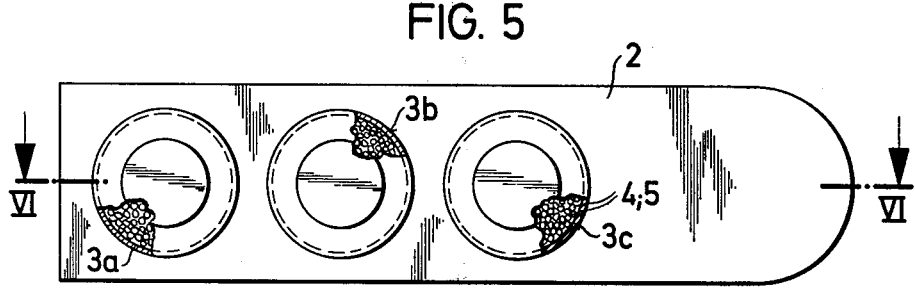
FIG. 5 is a top view of another embodiment of a throw-away thermometer for indicating various temperatures in accordance with the present invention.
Figure 6:
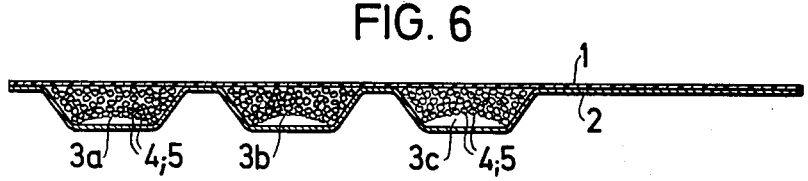
FIG. 6 is a sectional view along the line VI—VI of FIG. 5.

The further embodiment shown in FIGS. 5 and 6 differs from the embodiment shown in FIGS. 1 and 2 by the fact that several cavities such as the three cavities 3a, 3b and 3c are provided within the metallic foil 2. These cavities are each filled with capsules 4 and 5 in a manner so that the indication of every cavity is at a temperature that is different from the temperatures of the other cavities. Thus the capsules 5 in the cavity 3a may contain a green dye and be adapted to be destroyed at a temperature of 98.6°F. The capsules 5 in the cavity 3b may contain a red dye and be adapted to be destroyed at a temperature of 100.4°F. The capsules 5 in the cavity 3c may contain a blue dye and be adapted to be destroyed at a temperature of 102.2°F. There may of course be provided less or more than three cavities with capsules 5 of correspondingly different behaviour. The temperatures at which the destruction of the capsules occurs may of course be selected at any desired values and depend on various factors such as the surface strength of the capsules 5.

Figure 7:
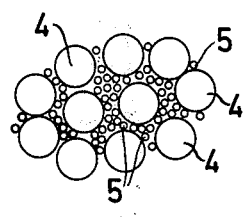
FIG. 7 is an enlarged schematical view of several paraffinic hydrocarbons-containing capsules and several indicating medium containing capsules.

In FIG. 7 are schematically illustrated several capsules 4 containing paraffinic hydrocarbons and several destructible capsules 5 containing the indicating agent, i.e. a dye. The interstices between the capsules 4 and 5 may be filled with a flow agent such as talcum of French chalk adapted to adsorb the dye upon destruction of the capsules 5. The diameter of the capsules 5 may corrrespond to approximately 1/16 of the diameter of the capsules 4 containing the paraffinic hydrocarbons. In a specific embodiment, the ratio of the capsules 4 to the capsules 5 may correspond approximately to 8.2. The capsules 4 and 5 may be manufactured in any suitable manner, for example according to a method for producing the capsules for "write-through" papers.

The thermometer shown in FIGS. 8 and 9 does not represent a disposable thermometer but a "normal" reusable thermometer that may be utilized any desired number of times.

In this embodiment, the capsules 4 are in the form of a suspension within an indicating fluid 13. The indicating fluid 13 may consist of a mixture of water and a dye. The plastic sheet 1 or the metallic foil 2 includes an integrally molded capillary tube 10. The suspension generally indicated at 12 extends more or less far along the capillary tube 10 in dependance upon the volume expansion of the capsules 4. The temperatures may be read in the conventional manner along a scale 11. The plastic sheet 1 is highly transparent at least in the area in which the fluid column must be visible, i.e., in the area of the scale 11.

The plastic sheet 1 and the metallic foil 2 may be made of sheet material having a thickness of about 0.2 to 1.5 mms, depending upon the desired rigidity.

In summary, it may be stated that the crystalline paraffinic hydrocarbons which may also be termed "expandable wax" are encapsulated within small capsules. These capsules or bodies expand upon heating in dependance upon the thermal expansion coefficient of the encapsulated substance and thereby act on the indicating medium. The indicating medium may consist of a liquid in which the capsules are suspended. The liquid lever in the capillary tube will progress or recede in proportion to the ambient temperature. The indicating agent may also consist of destructible capsules containing a dye producing upon destruction a distinct color change to indicate that a specified predetermined temperature has been reached. The capsules or bodies 4 may be of an approximately spherical configuration and may have a diameter from between 50 to 300 microns, and a wall thickness of approximately 2 to 10 microns.

What is claimed is:

1. A thermometer working on the basis of volume expansion of paraffinic hydrocarbons such as eicosane, heneicosane and docosane, and including an indicating agent disposed within an enclosed cavity wherein said paraffinic hydrocarbons are encapsulated within a first multitude of relatively small capsules disposed within the indicating medium.

2. A thermometer as in claim 1, wherein the capsules encapsulating the paraffinic hydrocarbons are made of gelatine and optionally include a plastic coating.

3. A thermometer as in claim 2, wherein the capsules are of a substantially spherical shape.

4. A thermometer as in claim 1, wherein the indicating agent comprises a second multitude of small destructible capsules containg a dye or pigment or a substance adapted to change color upon destruction of the capsules.

5. A thermometer as in claim 4, wherein the capsules containing the indicating agent are of a substantially spherical shape.

6. A thermometer as in claim 4, wherein the capsules or spheres containing the indicating agent are of a smaller size than the capsules of the first multitude of paraffinic hydrocarbons-containg capsules.

7. A thermometer as in claim 6, wherein the capsules or spheres containing the indicating agent are of a diameter corresponding approximately to 1/16 of the diameter of the paraffinic hydrocarbons-containing capsules.

8. A thermometer as in claims 4, wherein the ratio of the amount of paraffinic hydrocarbons-containing capsules to the indicating agent-containing capsules corresponds approximately to 8:2.

9. A thermometer as in claim 4, wherein a flow agent such as a blotting paper material or talcum for adsorbing the dye of the indicating agent upon destruction of the indicating agent-containing capsules is provided in admixture with the first and second multitudes of capsules.

10. A thermometer as in claim 1, wherein the indicating agent consists of a substance adapted to change color upon destruction of the skin of the paraffinic hydrocarbons-containing capsules, this substance being admixed with the paraffinic hydrocarbons.

11. A thermometer as in claim 1, wherein the thermometer is in the form of a disposable or throw-away thermometer.

12. A thermometer as in claim 1, wherein a metallic foil is bonded or welded at its one surface to the opposite surface of an at least partly transparent plastic sheet, the metallic foil defining at least one cavity for receiving the capsules containing the paraffinic hydrocarbons and the capsules containing the indicating agent, and the optional flow agent.

13. A thermometer as in claim 11, wherein are provided several cavities for receiving dye containing capsules, the capsules in every cavity being destructible at a temperature different from the temperature at which the capsules in any of the other cavities are being destructible, and the capsules in the various cavities optionally contain dyes different from cavity to cavity.

14. A thermometer as in claim 11, wherein a side wall of the one or several cavities is curved concavely inwardly.

15. A thermometer as in claim 1, wherein said paraffinic hydrocarbons-containing capsules form a component of a fluid indicating medium.

16. A thermometer as in claim 1, wherein said paraffinic hydrocarbons-containing capsules form a component of a paste-type indicating medium.

17. A thermometer as in claim 15, wherein a metallic foil is welded or bonded as its one surface to the opposite surface of a transparent plastic sheet, the metallic foil and the plastic sheet jointly delimiting a cavity for receiving a major portion of the capsules and the fluid indicating medium, and defining a capillary tube.

18. A thermometer as in claim 17, wherein said cavity is of an annular configuration.

19. A thermometer as in claim 15, wherein said fluid indicating medium comprises a mixture of water and a dye.

20. A thermometer as in claim 4, wherein said capsules containing said paraffinic hydrocarbons or said capsules containing said indicating medium and optionally said paraffinic hydrocarbons are combined into a tablet or pellet adapted to be inserted into the other components of the thermometer.

* * * * *